US007530263B2

United States Patent
Sowle (10) Patent No.: US 7,530,263 B2
(45) Date of Patent: May 12, 2009

(54) VEHICLE PARASITIC LOSS AND DRIVE LINE EFFICIENCY TEST FIXTURE AND METHOD

(75) Inventor: Jack M. Sowle, Jackson, MI (US)

(73) Assignee: Chrysler LLC, Auburn Hills, MI (US)

( * ) Notice: Subject to any disclaimer, the term of this patent is extended or adjusted under 35 U.S.C. 154(b) by 93 days.

(21) Appl. No.: 11/624,259

(22) Filed: Jan. 18, 2007

(65) Prior Publication Data
US 2008/0173101 A1    Jul. 24, 2008

(51) Int. Cl.
*G01M 17/00* (2006.01)
(52) U.S. Cl. .................... 73/118.01; 73/116.05
(58) Field of Classification Search ............. 73/114.13, 73/114.14, 114.15, 114.24, 114.25, 115.01, 73/116.05, 116.06, 116.07, 116.08, 118.01, 73/118.02
See application file for complete search history.

(56) References Cited

U.S. PATENT DOCUMENTS

| 3,651,690 | A | * | 3/1972 | Pagdin et al. ............ 73/116.06 |
|---|---|---|---|---|
| 4,062,234 | A | | 12/1977 | Bartlett, Jr. et al. |
| 4,466,294 | A | * | 8/1984 | Bennington et al. ...... 73/862.13 |
| 4,669,318 | A | * | 6/1987 | Angstrom ................ 73/862.09 |
| 5,844,145 | A | * | 12/1998 | D'Angelo ................ 73/862.18 |
| 5,859,369 | A | * | 1/1999 | Meyer et al. ............. 73/862.09 |
| 6,257,054 | B1 | | 7/2001 | Rostkowski et al. |
| 6,886,811 | B2 | | 5/2005 | Springett et al. |
| 7,036,360 | B1 | * | 5/2006 | Gushman et al. ......... 73/115.01 |
| 2003/0079529 | A1 | * | 5/2003 | Leep ........................... 73/117 |
| 2005/0028584 | A1 | * | 2/2005 | Barnes et al. .............. 73/117.1 |

* cited by examiner

*Primary Examiner*—Eric S McCall
(74) *Attorney, Agent, or Firm*—Ralph E. Smith (57) ABSTRACT

A testing apparatus that is used for measuring a vehicle's parasitic loss and overall, loaded efficiency utilizes an external electric drive motor, as an input, connected to the engine crankshaft of the vehicle and dynamometers connected to each driving wheel hub, to measure output at the wheels. Although its wheels with tires are removed, the vehicle remains largely intact and rests upon vehicle supports, which are mounted to a track system under the vehicle. The track system permits the drive motor and dynamometers to adjust and accommodate any vehicle for efficiency analysis. A computer monitors the driving motor input and output at the dynamometers to calculate efficiency.

11 Claims, 6 Drawing Sheets

VEHICLE PARASITIC LOSS AND DRIVE LINE EFFICIENCY TEST FIXTURE AND METHOD

FIELD OF THE INVENTION

The present invention relates to a vehicle test fixture and method of testing and measuring parasitic losses relevant to a vehicle drive line.

BACKGROUND OF THE INVENTION

Modern vehicles employ various engine-driven components, auxiliary and otherwise, that consume rotational energy output by an engine. Additionally, vehicles employ driveline components that are rotationally driven by, and thus consume, rotational energy generated by the engine. This consumption of energy by such components is in addition to the energy consumed by the engine itself, such as to overcome the friction generated by moving parts within the engine. Testing of such components, whether an auxiliary component or a driveline component, historically required removing such component from a corresponding vehicle and individually testing the component. While such historical testing method of removing a component and then testing it for energy losses or consumption associated with such component has generally proven satisfactory for its purpose, such method and apparatus was not without limitations.

What is needed then is a device and method that does not suffer from such limitations. This, in turn, will provide a device and method that permits a vehicle's total parasitic loss to be measured instead of merely a single vehicle component energy losses and permits total vehicle and individual component efficiency to be measured and calculated with minimal vehicle disassembly.

SUMMARY OF THE INVENTION

A vehicle test apparatus is used to measure overall vehicle efficiency. An external drive motor may be connected to an engine crankshaft of the vehicle, a dynamometer may be connected to each of the drive wheels of the vehicle, a track system may reside under and about the perimeter of the vehicle, and a number of vehicle supports may be used to support the vehicle on the track system. Because of the track system and efficiency calculating method employed, the apparatus may be used to measure overall vehicle efficiency without removing key components from the vehicle, such as the engine, transmission, transfer case, etc. Furthermore, the drive motor and the plurality of dynamometers are movable within the track system to accommodate various sizes of vehicles and their associated drive systems.

A computer connects with the drive motor for governing and monitoring motor driving torque and with the plurality of dynamometers to adjust and monitor wheel load torque. A torque transducer may be positioned between the drive motor and the engine crankshaft during employment of the drive motor.

Further areas of applicability of the present invention will become apparent from the detailed description provided hereinafter, it should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses, in accordance with the present invention. FIGS. 1-7 depict a vehicle driveline in various states of assembly upon which an overall vehicle efficiency may he measured by utilizing a vehicle test fixture, while FIG. 8 depicts a flowchart of various steps involved in the efficiency measurement.

Before actually measuring an overall driveline efficiency of a stationary vehicle utilizing a total vehicle support test fixture, various vehicle operating parameters must be measured including a road profile of the test vehicle. A vehicle wheel alignment needs to be completed with the alignment set to its nominal specifications, and the tire pressure to the normal cold Inflation pressure. This ensures that the efficiency of the vehicle being tested is not skewed by maladjustment of the vehicle. Because the invention relates to measuring the driveline efficiency of a vehicle during steady state operation, vehicle component parameters must be recorded with the vehicle engine operating at steady state before performing any actual efficiency calculations in accordance with the invention. Vehicle parameters may include: engine oil sump temperature, engine coolant temperature, transmission oil temperature, transfer case oil temperature, front and rear axle oil temperatures, power steering fluid or oil temperature, and transmission line pressure in each gear versus speed/RPM/throttle settings, including wide open throttle ("WOT"). After the above measurements are recorded and stored in a computer for a particular vehicle, a road coastdown test must be performed in order to calculate a "road driving force versus velocity" graph which may be used to set load dynamometers during actual vehicle efficiency parameter measurement while the vehicle is upon a test fixture.

An actual vehicle road coastdown test involves operating a vehicle on a level road surface at a specific speed, 75 mph for example, to achieve steady state component temperature conditions, and then releasing the accelerator as the transmission is shifted to neutral and recording the lime for the vehicle to coast to a complete stop. With the weight of the vehicle as a known quantity, the power or force required to move the vehicle down the road at a constant velocity may he calculated. In one example, 250 lbs of horizontal force is required to move a vehicle down a level road at a constant 50 mph.

Figure 5:
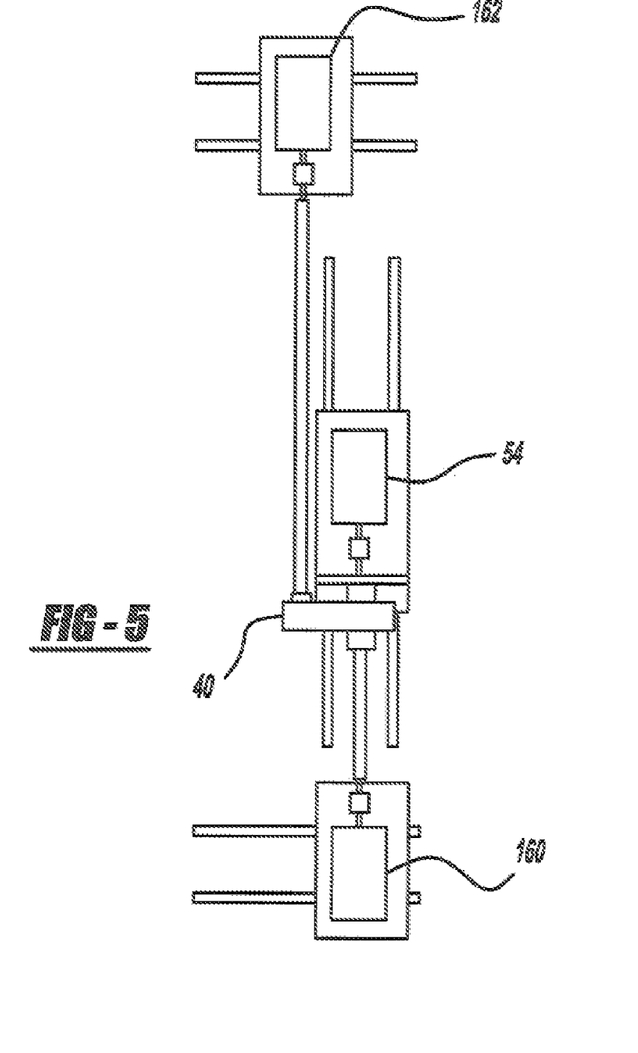
FIG. 5 is a top view of a transfer case of a vehicle used in a transfer case spin loss test.
Figure 6:
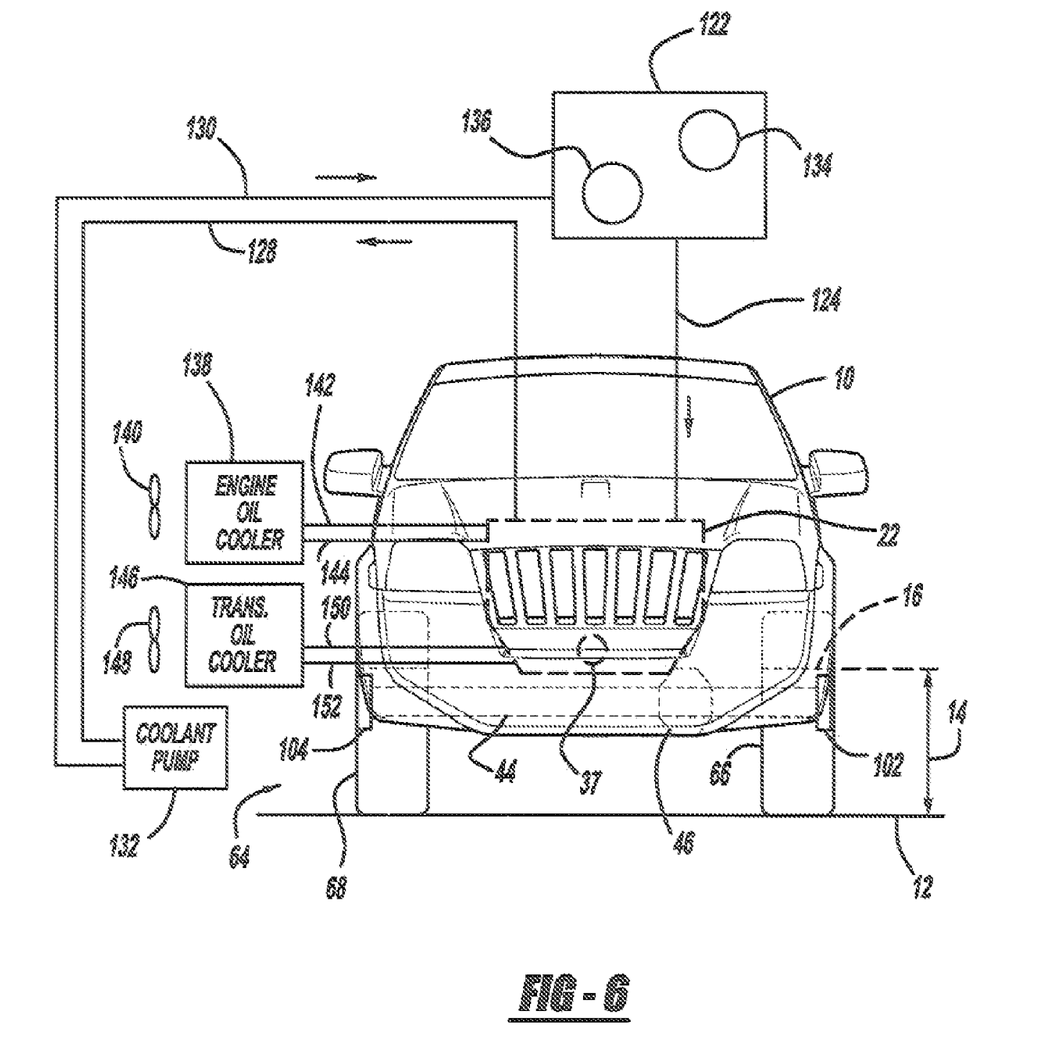
FIG. 6 is a front view of a vehicle depicting various components during parameter measurement.
Figure 7:
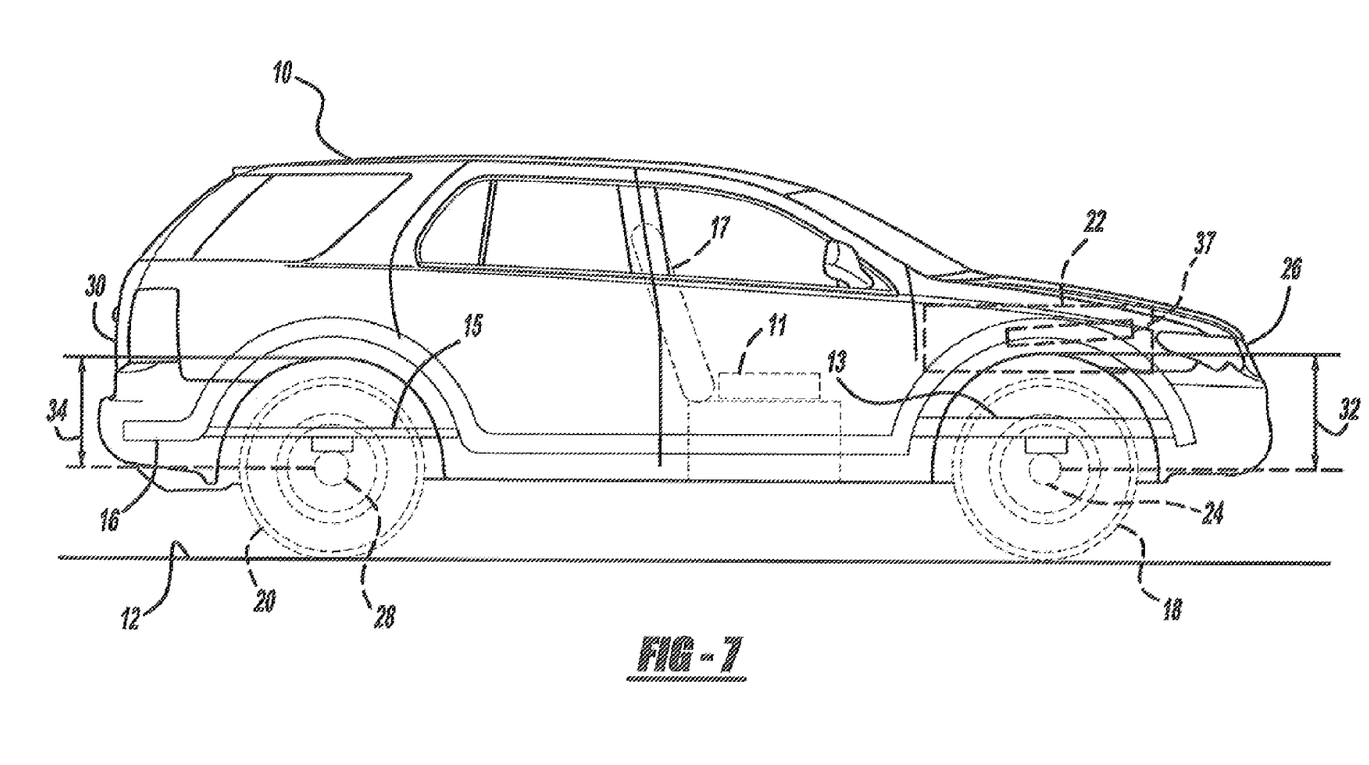
FIG. 7 is a side view of a vehicle depicting various support locations of the vehicle frame and suspension.
Figure 8:
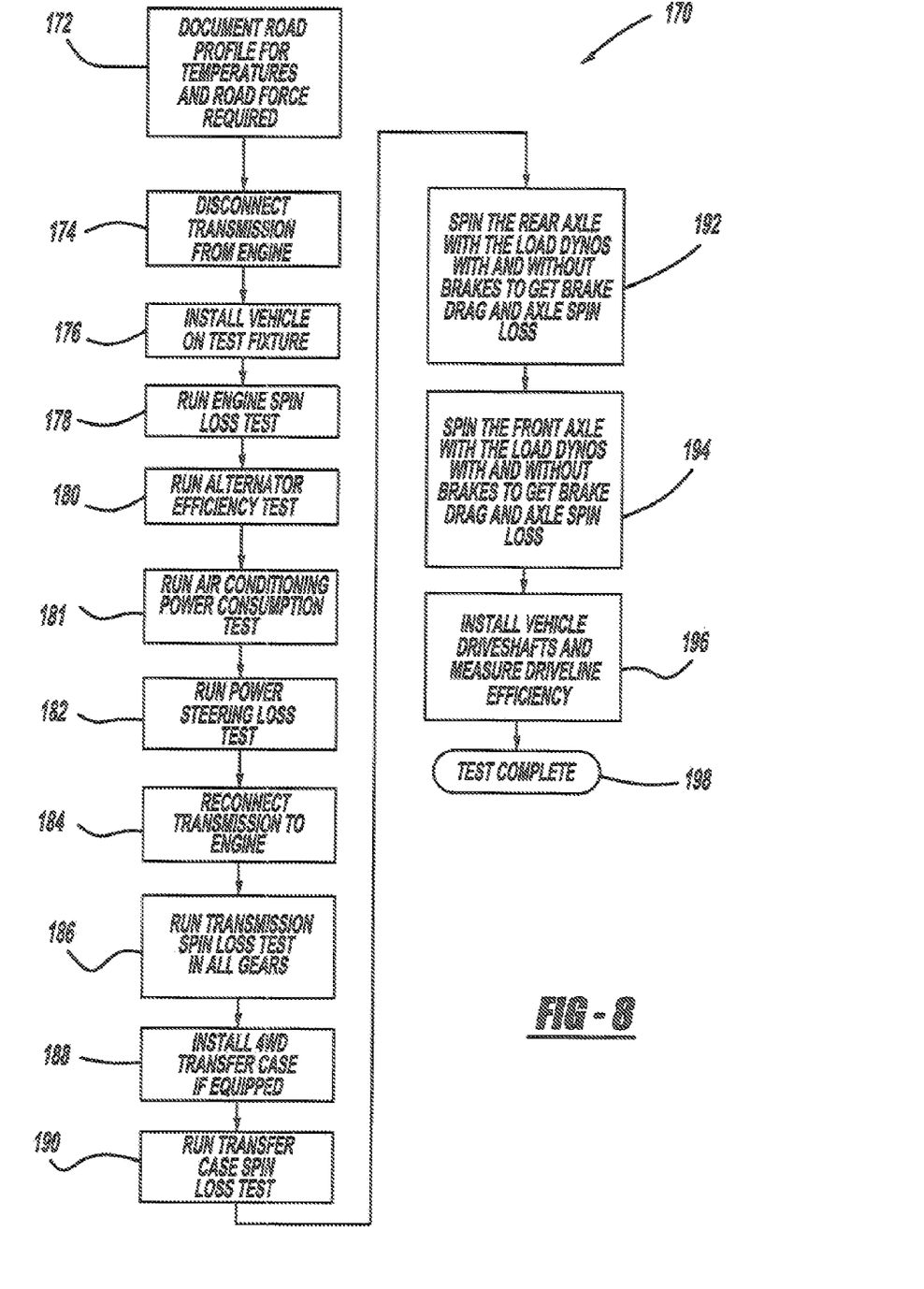
FIG. 8 is a flowchart of a vehicle test procedure for measuring various vehicle parameters used in calculating overall vehicle efficiency.

Now, with reference to FIGS. 1-8, a more specific description of the invention will he presented. Upon completion of the road coastdown test and associated steady state parameter readings, a vehicle 10 (FIG. 7) whose efficiency is to be measured has its fuel tank filled with fuel while 150 pounds of ballast 11, to simulate the weight of passengers, is placed in each of the front seats 17 of the vehicle 10. FIGS. 8 and 7 depict a vehicle 10 resting on a level surface 12, and at six locations, as an example, the height 14 from the surface 12 to a vehicle frame 18 is measured. Recommended locations for measuring the distance from the surface 12 to the frame 18 are; relatively close to the front wheels 18, relatively close to the rear wheels 20, and proximate a front area of the frame 16 that supports the engine 22, because adequate support for the engine 22 is required when the vehicle is resting upon the test fixture.

Distances from the surface 12 to the suspension support points that are used to support the suspension during testing, such as the front springs 13 and the rear springs 15 are measured. The distance 32 from the center of the front wheel hub 24 on the axle centerline to the bottom lip of the front fender 28 and the distance 34 from the center of the rear wheel hub 28 on the axle centerline to the bottom lip of the rear fender 30 are measured. Finally, the angle of the crankshaft 37 to horizontal is also measured. The above-noted measurements are used to initially set the vehicle 10 riding angle and suspension heights before testing of the vehicle 10 which ensures that the vehicle 10 is as close to its real-life operational position as possible during stationary vehicle operation and efficiency parameter testing measurement. If the vehicle or vehicle suspension is positioned at a slightly different angle than that of the real-life operational position, the efficiency parameters and thus the calculated vehicle efficiency may be skewed. With the above measurements complete, the vehicle 10 may be installed on a test fixture.

Figure 1:
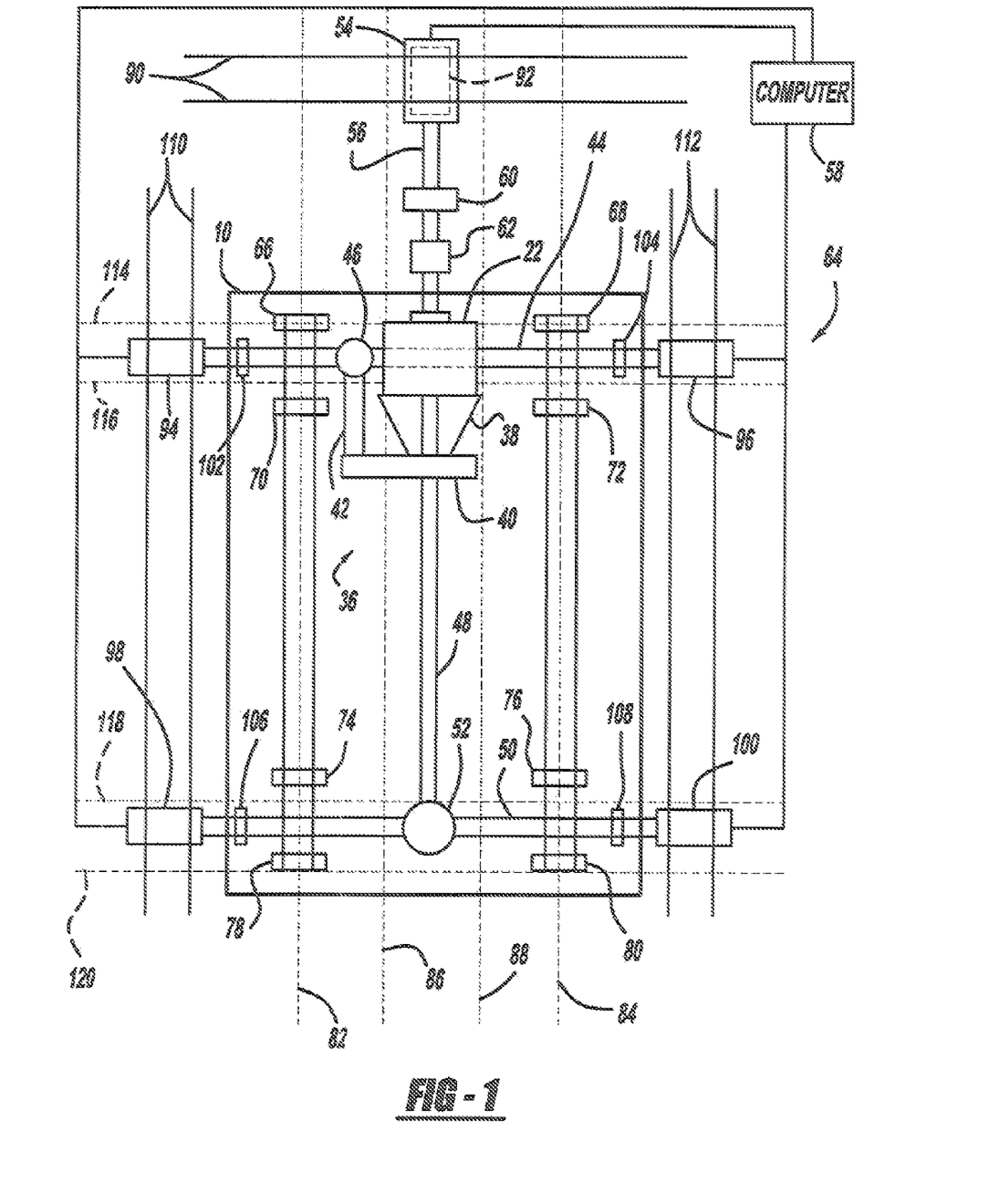
FIG. 1 is a top view of a four wheel drive vehicle depleting driveline and associated components used in calculating an overall vehicle efficiency.

With reference now primarily to FIG. 1, further explanation of the driveline components will be presented. In order to arrive at a numerical value for an overall efficiency of the vehicle driveline 38, the torque losses of the engine 22 need to be determined and separated from the balance of the driveline losses. The separation is necessary because the engine 22 will be simulated by an external drive motor 54, to be elaborated on later. The driveline 38 is the mechanism that transmits power from the engine 22 to the driving wheels of the vehicle 10 and is normally composed of components including the engine 22, transmission 38, transfer case 40, front axle gears within a front differential housing 48, rear drive shaft 48, and rear axle gears within a rear differential housing 52. A "loss" is a quantify of torque or power "lost" or consumed by the driveline 38 during its operation, in order to determine the engine losses vis-á-vis the balance of the driveline losses, the transmission 38 is disconnected from the flex plate or engine flywheel (not shown), which isolates the engine 22 from the transmission 38. With an external drive motor 54 coupled to the engine 22 with a shaft 56, the torque required to operate the engine 22 becomes a measurable quantity.

The shaft 58 connects to the crankshaft 37 (FIG. 7) of the engine 22 using an adapter plate, which may be specially crafted and adapted to the particular engine being turned by the motor 54. Elaborating on the shaft 58 used in turning the engine 22, several intermediate components exist between the electric drive motor 54 and the engine 22. More specifically, a torque limiting slip clutch 60 and a dual stage high accuracy torque transducer 62 are interposed between the drive motor 54 and the engine 22 and are part of the overall drive shaft 56 that joins the drive motor 54 to the engine 22. The torque limiting slip clutch 80 protects the torque transducer 82 in the event of a torque overload situation, which could occur if the engine 22 seizes due to failure, or a power outage that might stop the flow of electricity to the drive motor 54, the result of which may damage the motor 54. The slip clutch 60 also permits constant torque application to the engine 22, thereby eliminating any backlash from the motor 54 which could adversely affect any of the driveline components. The high accuracy torque transducer 82 is an electromechanical device that converts rotational energy to an electrical signal for the purpose of measuring torque and inputting such values over time to the computer 58.

With continued reference to FIG. 1, further details of the present invention will be described. FIG. 1 depicts the electric drive motor 54 connected to the engine 22, and when driven by the motor 54 in a disconnected state from the transmission 38, the torque losses of the engine 22 are measured by the torque transducer 62 and input to the computer 58. As depicted in FIG. 1, the vehicle 10 may rest upon a series of vehicle stands 86-80 that mount into tracks 82 and 84 under the vehicle 10. Although tracks 82 and 84 are depicted as tracks that might lie under the vehicle frame 18, other tracks or slotted bed plates 86 and 88 may be used in conjunction with the vehicle stands to support a vehicle. The test fixture is flexible such that a variety of vehicle types, whether equipped with a frame or of a unibody construction, can be accommodated upon the stands 86-80 and the tracks or slotted bed plates 82-88.

Similar to the stands 86-80 that support the vehicle 10, the various components used about the perimeter of the vehicle to assist in measuring efficiency parameters are also capable of traversing about the vehicle 10 in tracks. For instance, the drive motor 54 may be configured on a mounting structure 92 that is capable of traversing in the track 90, or in tracks 82-88 to provide the motor 54 a full range of motion when being positioned in front of a vehicle 10 to effectively mount the drive motor 54 to the crankshaft 37 (FIG. 7). This mobile advantage permits faster and simpler connections between the motor 54 and the crankshaft 37, since the motor 54 and vehicle manipulations during connection are eliminated or at least reduced. Continuing with the alignment of various components on the test fixture 84, the stands 88-80 may be adjusted to a height that will allow the axles to be at the proper height for alignment to load dynamometers 94-100. For instance, a dynamometer 94-100 may be mounted to each of the wheel hubs 102-108, respectively, after removal of the wheel at each of the wheel hubs 102-108. The stands 68-80 permit the vehicle suspension. Including the springs 13,15 to rest at their proper, pre-fixture height.

Similar to the drive motor 54 and vehicle 10, the dynamometers 94-100 traverse within the test fixture 64, and more specifically, within tracks. More specifically, the dynamometer 94 may traverse along the length of the vehicle 10 via track 110, while dynamometer 96 may traverse the vehicle 10 using track 112. To properly be positioned toward or info the vehicle 10 and mount to the wheel hub 102, the dynamometer 34 may traverse within track 114, track 116 or a combination of such tracks should the application require such. Similar to the drive motor support 92, the dynamometers 94-100 may be fixed to supports to traverse their respective tracks. Like dynamometer 94, dynamometer 98 also moves within or upon tracks 114 and 116 to facilitate its connection to wheel hub 104. Similarly, dynamometer 98 may utilize tracks 110, 118 and 120 to facilitate its connection to wheel hub 106, while dynamometer 100 may utilize tracks 112, 118 and 120 to facilitate its connection to wheel hub 108. Like the drive motor 54, the dynamometers 94-100 are linked into the computer 58 to monitor and control the loads applied to the respective wheel hubs 102-108.

While parasitic losses attributable to various vehicle components are tested with a vehicle 10 largely intact and with minimal modifications when fixed to the test fixture 84, certain vehicle systems may require modification prior to testing. Cooling systems are one such area that may require modification or re-configuration prior to loss measurements; however, all modified or re-configured cooling systems will retain their proper function so as to provide cooling to the applicable component commensurate with actual real world driving. Generally, high velocity push or pull type cooling fans are employed and cycled via a feedback system using thermocouples on each component to be cooled as required to maintain constant temperatures during testing. Because the driveline components generate heat due to friction, and the engine generates heat due to friction and compression, the engine and driveline components require adequate cooling capacity to cool them and maintain steady-state operating temperatures, especially at higher engine speeds, such as over 2,000 RPM for example.

Continuing with cooling of vehicle components, FIG. 8 is a front view depicting a test vehicle 10 configured with cooling components. As depicted, an Inline engine application may require relocating the vehicle radiator 122, so that the drive motor 54 and associated shafting may be connected to the crankshaft 37 of the engine 22. in the configuration depicted, the radiator 122 is relocated above the engine 22. With the thermostat (not shown) secured in the open position, the upper cooling fan 134 and tower cooling fan 138 are relied upon to cool the engine 22 with the liquid coolant flowing through the radiator 122. More specifically, during engine cooling, an engine coolant pump 132 pumps liquid coolant from the pump 132 to the radiator 122 via a hose 130 while a hose 124 transfers the coolant from the radiator 122 to the engine 22 via a hose 124. After absorbing heat from the engine 22, the liquid coolant is continues by flowing back to the pump 132 via a hose 128. The radiator 122, with its heat removing capacity, permits the engine 22 to operate at an acceptable, steady state temperature typical of the steady-state temperature experienced by the engine 22 during highway driving at a constant speed, such as 60 mph for example. Regarding coolant hoses 124, 128, and 130, which may be different from the original vehicle hoses, the hose inside diameters are maintained as close to the original hose diameter as possible to maintain heat removing characteristics typical of the original vehicle cooling system installation.

Figure 3:
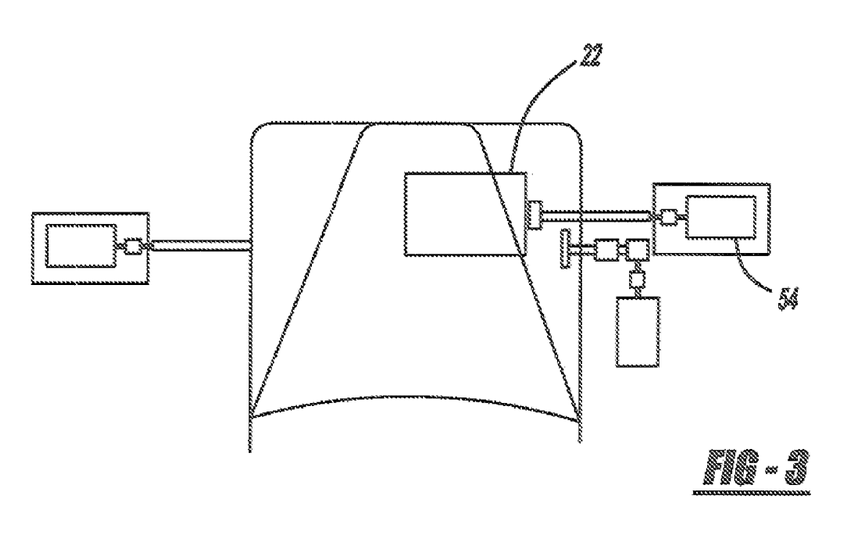
FIG. 3 is a top view of a front wheel drive vehicle situated within a vehicle efficiency test cell.

The engine layout described above relates to an inline engine, which is typically employed in a rear-wheel drive vehicle; however, the teachings of the present invention may be employed on a vehicle with a transversely mounted engine such as is typically applied to front wheel drive vehicles, as is depicted in FIG. 3. In a vehicle with its engine mounted transversely, the radiator 122 may not need to be moved or reconfigured; however, air, typically supplied by electric fans, must be supplied in adequate amounts to ensure engine cooling.

White continuous cooling must be provided to the engine coolant circulating in the water jacket of the engine 22, cooling must also be provided for the engine and transmission oils (FIG. 8). Regarding the engine oil, an external engine oil cooler 138 provides the necessary cooling to the oil circulating in the engine 22. More specifically, the engine oil is cooled at the engine oil cooler 138 by forced air from a fan 140 as the oil circulates through hoses 142, 144 between the engine oil cooler 138 and the engine 22. To facilitate use of such an external engine oil cooler 138, an adapter (not shown) may be made and installed within the engine's oil filter (not shown). Additionally, forced air may be passed over the engine oil pan sump or Nitrogen cooling may be utilized to cool the engine oil.

Similar to the external engine oil cooler 138, an external transmission oil cooler 146 may be employed to cool the transmission oil within an automatic transmission 38. The transmission oil is cooled at the transmission oil cooler 148 by forced air from a fan 148 as the oil circulates through hoses 150, 152 between the transmission oil cooler 146 and the transmission 38. To facilitate use of the external transmission oil cooler 146, an adapter (not shown) may be made and installed in the transmission 38. As an alternative to the external transmission oil cooler 148, a high speed fan may be used to pass air over the vehicle's own transmission oil cooler, if so equipped. As an alternative to air cooling, cold water or Nitrogen cooling may he applied to the external transmission oil cooler 148 in order to cool the circulating oil.

Continuing with component cooling, because the vehicle 10 is stationary when mounted to the test fixture 64, other components and systems require cooling that would normally occur in a real life driving environment. On a four-wheel-drive ("4WD") vehicle, the transfer case 40 (FIG. 1) may be continuously cooled by using a high velocity air fan (not shown). Similarly, the front axle 44 with front differential housing 46 and rear axle 50 with rear differential housing 52 may be cooled by individual high velocity air fans (not shown). While the individual high velocity air fans for the transfer case 40, front axle 44, and rear axle 50 are not specifically depicted in the Figures, they are similar to the individual cooling fans 140 and 146 used to cool the engine oil cooler 138 and transmission oil cooler 146, respectively. Additionally, the power steering pump, alternator, and front engine accessory drive belts (all not depicted) may require the benefit of auxiliary high velocity cooling fans, especially under high alternator loads. Finally, when the vehicle air conditioning system operates during testing, the A/C condenser will need significant air flow through it to cool the internal refrigerant therefore, an external cooling fan, similar to that applied to the engine oil cooler 138, may be necessary.

Measurement and testing involved in arriving at the torque losses in the vehicle drivetrain and accessory components will now be explained.

Engine Spin Loss Test

Figure 2:
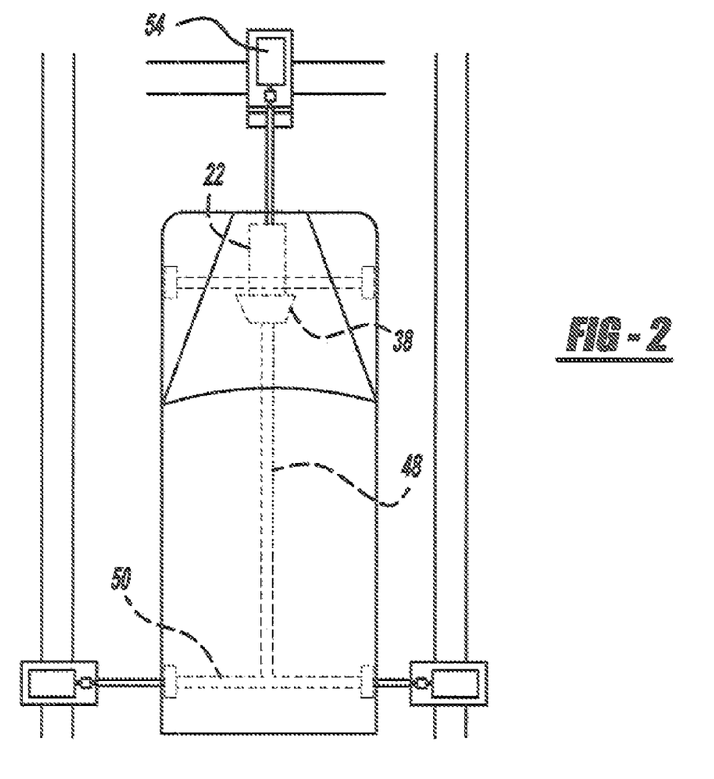
FIG. 2 is a top view of a two wheel drive vehicle configured for vehicle efficiency testing.

With the road coastdown test successfully completed and the vehicle installed on the test stand, as presented above, an engine spin loss test may be conducted. With the transmission 38 disconnected from the flywheel of the engine 22, the engine throttle fully closed, and all accessories turned off, the external drive motor 54 is used to turn the engine 22 at 2000 RPM. With reference to FIG. 2, with the transmission 38 disconnected, the rear drive shaft 48 and rear axle 50 are prevented from turning. When the engine coolant and oil temperatures are at normal steady state operating temperatures, the engine RPM can be returned to 1000 RPM. With no alternator or AC compressor loading, the external drive motor 54 is turned in 400 RPM increments from 1000 RPM to 4800 RPM. Data is collected for three minutes at each RPM increment and then in reverse through the same 400 increments. The test may be repeated to provide statistically valid data that is stored in the computer 58.

Data recorded by the computer 58 during the spin loss test may consist of: engine speed, engine input torque of the drive motor 54 as measured by the high accuracy torque transducer 82, air temperature, engine coolant temperature, engine oil temperature, manifold absolute pressure ("MAP"), barometric pressure, and engine oil pressure. The MAP may be used to determine the absolute pressure (not the relative to atmospheric pressure) of the air inside the engine intake manifold and the atmosphere (barometric pressure). This Information may be used to determine the density of the air entering the combustion chamber, which may be used to correct the engine 22 spin loss data for changes in barometric pressure. FIG. 3 depicts an arrangement of a front wheel drive ("FWD") vehicle upon which an external drive motor 54 is connected to an engine 22.

Alternator Power Consumption

The power consumption of the alternator may also he determined by following the steps of the spin loss test noted above and then running the alternator at 40 amperage load steps based on the maximum alternator output rating. As an example, for a 180 amp alternator, the bad points would be 40, 80, 120 and 160 amperes. To provide adequate cooling for the alternator, cooling air may be blown on the alternator and its drive belt. Alternator output voltage and amperage may be recorded at the same frequency as the engine RPM data of the engine spin loss test above and stored in the computer 58. Data as collected during the Engine Spin Loss Test may again be collected and stored in the computer 58.

Air Conditioning Power Consumption

The power consumption (spin loss) of the vehicle air conditioning system may be determined by following the steps of the spin loss test above, but only after a temperature and an air conditioning blower fan speed setting are selected. That is, the test is conducted with the vehicle air conditioning system running. Cooling air from an external fan may be blown on the air conditioning compressor drive belt and the air conditioning condenser to provide cooling so they are maintained at an acceptable operating temperature. Because the alternator is not charging the battery during the air conditioning test since the alternator is disconnected, an external battery charger may be connected to the vehicle battery to keep the batter charged to operate the electrical components of the air conditioning system, such as the compressor's clutch. The AC compressor head pressure and the AC. system outlet air temperature and the power draw of the clutch and blower may be monitored and stored in the computer 58. Data as collected during the Engine Spin Loss Test may again be collected and stored in the computer 58.

Power Steering Pump Loss

The power steering pump driven by the engine has losses associated with it, and to approximate such losses for purposes of the present invention, the power steering pump may be disassembled to have its vanes removed, which will eliminate all losses except the bearing losses. Therefore, with the vanes removed, the same test as described in the Engine Spin Loss Test may be performed. Data as collected during the Engine Spin Loss Test may again be collected and stored in the computer 58.

Front Engine Accessory Drive Belt and Pulley Losses

To measure the losses associated with the front engine accessory drive ("FEAD") belt and pulleys, with the vehicle in the same condition as in the Power Steering Pump Loss Test described above, the FEAD belt is removed and an auxiliary cooling pump and tubing may be plumbed into the engine 22 to circulate coolant through the engine 22, When the FEAD belt is removed, the water pump of the engine does not spin, thus necessitating an auxiliary coolant pump to cool the engine during spinning by the drive motor 54. The Engine Spin Loss Test described above may then be performed with the power steering pump, AC system and alternator turned off. Data as collected during the Engine Spin Loss Test may again be collected and stored in the computer 58.

Transmission Spin Loss Test

Conducting the transmission spin loss test in accordance with the teachings of the present invention involves reconnecting the transmission 38 to the engine 22. In reconnecting the transmission 38 to the engine 22, any associated spacers must be removed from between the engine 22 and transmission 38, if utilized during disconnection of the engine 22 and transmission 38 for the Engine Spin Loss Test, and the transmission's torque converter may be reconnected to the flex plate. In the case of a manual transmission, the clutch will need to be reinstalled because its removal may be required in conducting the Engine Spin Loss Test, if the vehicle is a 4WD vehicle, the transfer case 40 will need to be removed, if possible, and a shaft installed on the transmission output shaft to contain the transmission oil. If the vehicle is a RWD or FWD vehicle, the driveshaft(s) will need to be removed and the shaft holes plugged to maintain seal contact and contain any lubricating oil.

Continuing with the transmission spin loss test, a transmission control box will need to be connected to the transmission, if an automatic, to control gear selection and transmission line pressure, if the transmission has a mechanical throttle/line pressure control, a control mechanism will need to be Installed to control throttle/line pressure. Spin loss tests need to be performed in each gear at the minimum and maximum and a midpoint of the measured line pressure during any pre-test testing. In one example of transmission testing, test points of 80, 120 and 135 PSI may be used; however, such pressure points may vary depending upon the transmission undergoing testing. Additionally, all transmission testing is performed with the transmission torque converter in a locked state, if possible. In certain instances, depending upon the transmission being tested, the transmission's valve body may need to be modified to be able to place the torque converter locked in first gear. Alternatively, first gear may be tested without the torque converter locked because real world driving conditions may prevent lockup of the torque converter in first gear. Concerning the transmission output shaft and engine speed, the engine RPM that equates to a transmission output shaft of 120 mph needs to be calculated for each gear prior to the start of testing. The applicable engine RPM should be the maximum engine RPM for each gear in the Transmission Spin Loss Test not to exceed 4800 rpm.

Transmission Spin Loss Test Sequence

Starting at the lowest transmission line pressure, the tests in the following paragraph regarding transmission gear spin loss tests are performed. The tests are then repeated for the other line pressure test points, such as 80, 120 and 135 PSI, for example. Ail data gathered at the various RPMs is stored in the computer 58 and may consist of: engine speed (RPM). calculated input torque required, measured input torque (N-m or ft-lbf), transmission input speed (RPM), transmission output speed (RPM), measured transmission ratio, left hand rear axle speed (RPM), and right hand rear axle speed (RPM), air temperature, coolant temperature, engine oil temperature, MAP, barometric pressure, engine oil pressure, transmission line pressure, transmission temperature, transfer case temperature, and rear axle temperature.

For the first gear spin loss test, the same RPM points are tested as in the first step of the Engine Spin Loss Test. For the second gear spin loss test, the same RPM points are tested as in the first step of the Engine Spin Loss Test. For the third through sixth gear spin loss tests, the same RPM points are tested as in the first step of the Engine Spin Loss Test, hut the engine RPM are not to exceed the 120 MPH transmission output shaft speed, unless the particular application requires testing at such speeds. The transmission Spin Loss Testing is repeated for each gear in each of the transmission line pressures.

Transfer Case Spin Loss Test

Upon completion of the transmission spin loss testing, the transfer case 40 may he reinstalled in the vehicle 10, as depicted in FIG. 1, to measure the spin losses of the transfer case 40 with the vehicle fully resident upon the test fixture 64. if the transfer case 40 has a selectable two wheel drive ("2WD") mode, the transfer case 40 should he tested in both 2WD and 4WD HI mode. With the transmission in the gear that best represents a 1 to 1 gear ratio, the same RPM measurement points as used in the Transmission Spin Loss Test may be tested for the Transfer Case Spin Loss Test. In the test, the load dynamometers are not attached. Data paralleling that recorded in the Transmission Spin Loss Test may be recorded in computer 58.

Alternatively, an arrangement such as that depicted in FIG. 5 may he used to test the spin losses and component efficiency of the transfer case 40. Still utilizing the test fixture 84 and associated tracking, the Transfer Case Spin Loss Test may involve an external drive motor 54 spinning the gearing of the transfer case 40 on an input side while a load dynamometer 160 representative of the rear axle steady state driving load for the particular vehicle being tested is configured on an output side of the transfer case 40. Similarly, a load dynamometer 182 may be configured to another output location of the transfer case 40, to represent the front axle loading during steady state driving with a vehicle equipped with a front driving axle, as is the case with the depiction of FIG. 5. With the input torque of the driving motor 54 known and the known loading of the load dynamometers 160, 162, the spin losses of the transfer case 40 may be determined. Similar data to that recorded during the Transmission Spin Loss Test may be recorded in the computer 58.

Rear Axle Spin Loss Test

The rear axle spin loss test is for rear wheel drive ("RWD") and all wheel drive ("AWD") vehicles. To perform this test with the vehicle 10 configured similarly to that depicted in FIG. 1, the brakes are removed from the rear axle 50 so that the spin losses can be measured from both, the axle output end and the axle input end. Testing begins at the rear axle input end, since dynamometers are not yet connected to the vehicle 10. The driveshaft 48 from the transfer case 40 to the rear axle 50 is installed and data is recorded for the same test points as tested in the Transfer Case Spin Loss Test. As with all testing, care needs to be taken to ensure that all driveline components are operated at a stable, warmed, steady-state condition because the data analysis is based on incremental differences between the power required to spin the driveline components with a drive motor. When all driveline components reach a steady-state operating temperature, the measurements may be performed using the same transmission line pressures and gears used for the Transfer Case Spin Loss Test discussed above.

Figure 4:
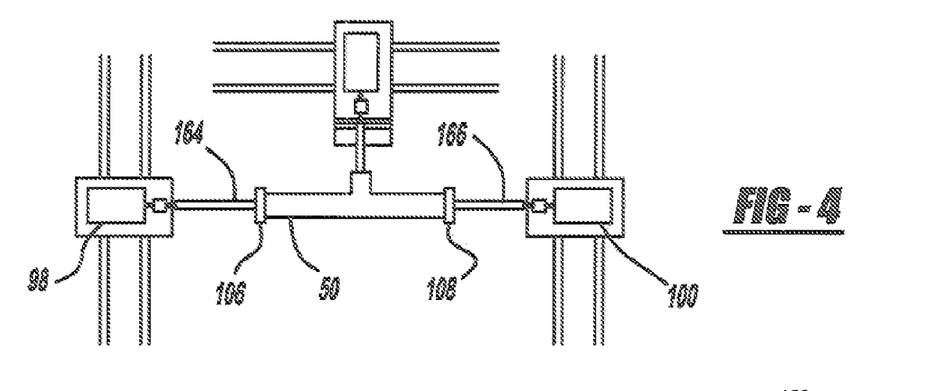
FIG. 4 is a top view of a rear axle of a vehicle used as part of a rear axle spin loss test.

With reference to FIGS. 1 and 4, the Rear Axle Spin Loss Test may also be performed at the output ends of the axle 50 by removing the driveshaft 48 between the transfer case 40 and the rear axle 50 and Installing output dynamometers 98, 100 at the rear wheel hubs or flanges 108, 108 respectively with intermediate shafts 164, 166. The output dynamometers 98, 100 are used to drive the rear axle 50 and measure the torque required to spin the axle from the wheel flanges 108, 108. The wheel speed RPM points need to be calculated by dividing the input RPM points by the axle ratio to get the wheel RPM points to test. Similar to prior measurements, the axle 50 needs to be at a steady-state operating temperature prior to starting data acquisition. This test may be conducted at the same driveshaft RPM points as those used for the Transfer Case Spin Loss Test discussed above.

Rear Brake Drag Test

The rear brakes may be reinstalled upon completion of the Rear Axle Spin Loss Test. The brake pedal needs to be depressed with approximately ten pounds of pressure and released with the engine turning at idle RPM to re-seat the brake pads. The front brake pads also need to be installed at this time or the front calipers need to be blocked to prevent the caliper pistons from being pushed out of the calipers. The rear axle 50 needs to be at steady state operating temperature prior to depressing and releasing the brake pedal and taking brake data, During testing, the axle, for example, may be rotated for five minutes at a 30 mph equivalent RPM while recording driving torque. After five minutes, the same RPM points are tested as were used for the Axle Spin Loss Test.

Front Axle Spin Loss Test

Front axle spin loss testing is performed on 4WD and AWD models by first removing the brakes from the front axle 44. The spin loss of the front axle 44 can then be separately measured from the axle output end and the axle input end. Testing begins with the input end because the output dynamometers may not yet be connected. The rear axle driveshaft 48 is removed and the front axle driveshaft 42 is installed. The same RPM points are tested as were tested in the Transfer Case Spin Loss Test, presented above. Again, all driveline components must be at a steady-state temperature condition because data analysis resulting from data measurement is based on the incremental difference between the powers required to spin the driveline components. Upon all driveline components reaching operating temperature, and the transfer case 40 in 4WD mode, data collection is performed at the same transmission line pressures and gear positions as during the Transfer Case Spin Loss Test presented above.

Front Brake Drag Test

Upon completion of the front axle spin loss testing, the front brakes may be reinstalled and the brake pedal depressed and released with approximately ten pounds of force with the engine turning at idle RPM to re-seat the brake pads. The rear brake pads need to be installed during this test or the calipers blocked to prevent the pistons from being pushed out of the calipers. Additionally, the front axle 44 needs to be at steady-state operating temperature prior to depressing and releasing the brake pedal and recording braking data. The front axle 44 is rotated for five minutes at the 30 mph equivalent RPM while recording the driving torque. After five minutes, the testing proceeds through the same RPM points used for the Front Axle Spin Loss Test presented above.

Road Coastdown Simulation Test

The road coastdown simulation test is used to measure total driveline friction during a simulated road coastdown test, in this test, the vehicle and equipment may be situated as depicted in FIG. 1. All driveline and brake components are Installed and operating in their normal driving mode. For 4WD vehicles, the transfer case 40 is positioned in 2WD mode if the transfer case 40 has a selectable 2WD mode. For AWD vehicles or vehicles without a selectable 2WD mode, the normal driving mode is used. For RWD or FWD vehicles, only the drive axle needs to be tested in the simulation test. Continuing, the test process involves ensuring that the brakes are seated (ten pounds of pedal pressure and released with proper vacuum in the brake booster) prior to the start of the warm-up procedure. The driveline is warmed to steady state operating temperatures by operating the engine at an RPM equivalent to 50 MPH road speed with the transmission in high gear until all driveline components are at their operating temperatures. The transmission 38 is then shifted to neutral and the wheels are driven by the output dynamometers following the time/speed trace that was recorded during the road coastdown test prior to connecting any dynamometers 94-100 to the vehicle 10. Alternatively, testing may he performed by conducting steady state speed tests and stepping down in speed at predetermined steps as defined in SAE J2452 Stepwise Coastdown Simulation Test for tire roiling resistance.

Driveline Efficiency Test

A driveline efficiency test determines how much of the power (torque) being applied to the driveline is actually realized at the driving axle. In the case of the present invention, how much of the torque input with the external drive motor 54 is transferred to the wheel hubs 106, 108 of the rear axle 50, and wheel hubs 102, 104 of the front axle 44, when applicable. Efficiency is essentially a determination of inputs divided by outputs, such as torque inputs and torque outputs. Testing requires that the brakes be removed from the driving axle(s) to eliminate variability in brake drag, which may skew test results and thus, efficiency calculations. The load dynamometers 94-100 are connected to the wheel flanges 102-108 on the driving axle(s). The load dynamometers 94-100 apply a road-equivalent load to the wheel flanges 102-108 based on a road force versus velocity curve that may be plotted with data acquired from the real-life road coastdown test prior to the vehicle 10 being installed on the test fixture 64. The transmission is tested in all forward gears using the same RPM points used during the Transmission Spin Loss Test. The transmission line pressure should be controlled to the pressure that was recorded on the road profile testing that was performed on the vehicle 10 prior to its installation on the test fixture 64. The tests should be performed with the torque converter in both conditions, locked and unlocked, if possible, in all gears except first gear unless the road testing shows torque converter lockup in first gear.

The accessory components have been measured in the testing described beginning with "alternator power consumption." The accessory component torque consumption is factored into the overall vehicle efficiency equation because such accessory components consume torque from the output of the engine. The overall efficiency of a vehicle is calculated in accordance with (input torque)/(output torque) or more specifically, (drive motor torque–engine loss torque)/(output torque measured at rear wheel locations). For a two wheel drive vehicle, the output torque is measured at two wheel locations, while for a four wheel drive or all wheel drive vehicle the output torque is measured at four wheel locations, using the load dynamometers 94-100.

FIG. 8 depicts a flowchart 170 of a vehicle efficiency testing and measuring procedure according to the present invention and generally highlights steps discussed in more detail above. Before explaining the steps noted in the flowchart 170, one should understand that the steps are for a 4WD vehicle. Therefore, when the flowchart refers to steps involving a transfer case and associated testing or a front drive axle and associated dynamometers, such tests are relevant for vehicles equipped with 4WD, for example.

Continuing with the flowchart 170, step 172 depicts where an on-road vehicle road profile is conducted. The road profile includes documentation of steady-state vehicle operating temperatures and the force required to move the test vehicle along a paved, level road. Such force required to move the vehicle along the road may he arrived at by calculation. Step 174 involves disconnecting the transmission 38 from the engine 22. This step isolates the engine 22 to arrive at the torque or spin losses associated with the engine 22 as determined by the torque transducer 82 and external drive motor 54. After arriving at the torque losses of the engine 22, such losses can be subtracted from of the overall driveline torque input by the drive motor 54 when the driveline is re-assembled to arrive at the driveline input torque used in calculating the overall vehicle driveline efficiency.

Continuing, at step 178, the vehicle 10 is installed in the test fixture 84, as described in more detail above with reference to FIGS. 1 and 6-7. Step 178 notes the conducting of the Engine Spin Loss Test, step 180 notes the conducting of the Alternator Efficiency Test, step 181 notes conducting of the Air Conditioning Power Consumption Test, and step 182 notes conducting of the Power Steering Loss Test. The respective tests associated with steps 178-182 are conducted as described above. Upon conclusion of the Power Steering Loss Test at step 182, the transmission 38 is reconnected to the engine 22, as noted in step 184 and the Transmission Spin Loss Test is conducted in all gears of the transmission as noted in step 186, in accordance with the above-noted details of the procedure.

Upon installation of the transmission 38 and completion of the Transmission Spin Loss Test 186, the 4WD transfer case 40 is installed in the vehicle at step 188 and the Transfer Case Spin Loss Test is conducted at step 190. Again, the installation of the transfer case 40 and its associated testing may only be conducted on vehicles equipped with 4WD. Upon completion of the Transfer Case Spin Loss Test at step 190, the logic flows to step 192 where the rear axle 50 is fumed with the load dynamometers 98, 100, with and without the brakes to arrive at the amount of torque necessary to overcome brake drag and turning of the rear axle 50. At step 192 and its associated testing, the driveshafts 42, 48 are not yet installed in the vehicle 10. Upon arrival at step 194, with the driveshafts 42, 48 still not connected, the front axle 48 is turned using the load dynamometers 34, 96 with and without the brakes attached to arrive at the amount of torque necessary to overcome brake drag and turning of the front axle 48. Upon completion of the front and rear axle spin loss tests to arrive at torque values for such losses, the front driveshaft 48 and rear driveshaft 50 are installed at step 198 and overall driveline efficiency may be calculated in accordance with the procedures previously described. Step 198 completes measurement and testing of torque values for the driveline 38 and calculation of the overall driveline efficiency.

While an apparatus for testing and measuring torque losses of vehicle components with minimal alteration of the vehicle has been presented above, along with a method of conducting such measurements, one should note that more than overall vehicle driveline efficiency may be calculated with the data input into and stored by the computer 58. For instance, plotting a graph of vehicle driveline efficiency at various engine RPM and In various gears of the vehicle transmission is possible. Additionally, regarding alternator efficiency, plotting graphs of alternator efficiency at various engine RPM and at various alternator amperage loads is possible. Furthermore, calculating and plotting overall vehicle efficiencies with specific driveline components included or removed permits one to determine how a vehicle may be configured to provide it with the best overall balance of driveline features (2WD, 4WD, FWD, RWD) yet achieve vehicle driveline efficiency goals.

The teachings of the invention have many advantages. First, the invention may be used to measure the driveline efficiency of a complete vehicle, without extensive vehicle modification. Simply stated, extensive bench testing is not necessary, and to the contrary, a vehicle driveline may be tested with little modification in its assembled state upon a vehicle test stand. Second, the Invention may be used to determine the parasitic loss of an entire vehicle or select pasts of a vehicle without extensive vehicle modification, such as removing multiple parts and constructing part jigs that secure such parts for individual testing. Third, by actually using the teachings of the invention and recording or measuring: one, the power input into a vehicle, to turn the entire driveline of a vehicle; two, the power input into a vehicle, to turn just the engine of the vehicle without the driveline; and three, the losses or recorded loads at each of the wheels, and at various stages throughout the vehicle, computer models may be established and continuously updated to reduce the cost of testing. That is, accurate computer simulations of specific component parts, such as transmissions, transfer cases, etc. may be used instead of actual vehicle testing. Such testing and measurement of overall vehicle efficiency may be used to improve vehicle fuel economy and part efficiencies.

The description of the invention is merely exemplary in nature and, thus, variations that do not depart from the gist of the invention are intended to be within the scope of the Invention. Such variations are not to be regarded as a departure from the spirit and scope of the invention.

What is claimed is:

1. A test apparatus for a vehicle, wherein the vehicle includes a driveline having a plurality of driveline components transmitting power from an engine to a plurality of driven wheels, and wherein vehicle operation is characterized by a profile representing road driving force versus vehicle velocity for a range of vehicle velocities, the test apparatus comprising:
a drive motor connected to a first driveline component; and
a first dynamometer connected to a second driveline component, wherein the first dynamometer generates a first output representative of the torque developed at the second driveline component when the first driveline component is driven by the drive motor over a range of speeds simulating the range of vehicle velocities of the profile.

2. The test apparatus of claim 1, further comprising:
a track system about the vehicle to permit translation of the drive motor and dynamometer relative to the vehicle; and
a plurality of vehicle supports, wherein the track system extends under the vehicle to permit positioning of the vehicle supports within the track system and under the vehicle to support the vehicle.

3. The test apparatus of claim 1, further comprising a torque transducer positioned between the drive motor and the first driveline component.

4. The test apparatus of claim 1, wherein the second component is a first driven wheel of the vehicle.

5. A test apparatus for a vehicle comprising:
a drive motor connected to a first component of the vehicle, wherein the first component is an engine crankshaft;
a first dynamometer connected to a second component of the vehicle; and
a track system about the vehicle to permit translation of the drive motor and dynamometer about a perimeter of the vehicle.

6. A test apparatus for a vehicle comprising:
a drive motor connected to a first component of the vehicle;
a first dynamometer connected to a second component of the vehicle;
a second dynamometer connected to a third component of the vehicle, where the third component is a driven wheel; and
a track system about the vehicle to permit translation of the drive motor and dynamometer about a perimeter of the vehicle.

7. A test apparatus for measuring torque of a vehicle comprising:
a drive motor connected to an engine crankshaft of the vehicle;
a dynamometer connected to each drive wheel of the vehicle;
a track system under the vehicle; and
a plurality of vehicle supports to support the vehicle on the track system.

8. The test apparatus of claim 7, further comprising:
a torque transducer positioned between the drive motor and the engine crankshaft of the vehicle.

9. The test apparatus of claim 7, wherein the drive motor and the plurality of dynamometers are movable within the track system to accommodate various sizes of vehicles.

10. The test apparatus of claim 7, further comprising:
a computer connected to the drive motor to monitor and adjust motor driving torque.

11. The test apparatus of claim 10, wherein the computer is connected to the plurality of dynamometers to monitor torque at the wheels.

* * * * *